United States Patent [19]

Haug

[11] Patent Number: 4,576,527
[45] Date of Patent: Mar. 18, 1986

[54] SHAPER CUTTER

[75] Inventor: Edward W. Haug, Rockford, Ill.

[73] Assignee: Barber-Colman Company, Rockford, Ill.

[21] Appl. No.: 615,775

[22] Filed: May 31, 1984

Related U.S. Application Data

[63] Continuation-in-part of Ser. No. 515,795, Jul. 21, 1983, abandoned.

[51] Int. Cl.⁴ ............................................. B23F 21/28
[52] U.S. Cl. ..................................................... 407/28
[58] Field of Search ..................................... 407/21–29, 407/15–19, 20, 31, 32, 120, 52; 83/697; 76/101 A

[56] References Cited

U.S. PATENT DOCUMENTS

| | | |
|---|---|---|
| 579,570 | 3/1897 | Fellows ................................. 407/28 |
| 1,855,511 | 4/1932 | Edgar . |
| 2,119,298 | 5/1938 | Simowski ............................. 407/27 |
| 2,305,145 | 12/1942 | Dalzen . |
| 2,693,020 | 11/1954 | Pelphrey . |
| 2,758,363 | 8/1956 | Praeg ..................................... 407/27 |
| 3,243,863 | 4/1966 | Carlsen . |
| 3,245,134 | 4/1966 | Zorn . |
| 3,270,395 | 9/1966 | Bonnafe ................................ 407/15 |
| 3,571,875 | 3/1971 | Grandi et al. . |
| 3,688,368 | 9/1972 | Bodem . |
| 3,711,910 | 1/1973 | Strejc . |
| 3,715,780 | 2/1973 | Johnson . |
| 3,762,006 | 10/1973 | Tersch et al. . |
| 3,868,883 | 3/1975 | Menne et al. . |
| 4,218,159 | 8/1980 | Langen ................................. 407/25 |

FOREIGN PATENT DOCUMENTS

| | | | |
|---|---|---|---|
| 42097 | 4/1979 | Japan ..................................... 407/20 |
| 1395282 | 5/1975 | United Kingdom .................. 407/16 |

Primary Examiner—Lowell A. Larson
Assistant Examiner—Jerry Kearns
Attorney, Agent, or Firm—Leydig, Voit & Mayer, Ltd.

[57] ABSTRACT

A shaper cutter includes a conical body having teeth formed around its periphery and a flexible wafer is disposed against the face of the body and is formed with peripheral teeth overlying the teeth on the body. The face of the body is concave and conical so that, when the center portion of the wafer is clamped to the body, the wafer flexes to lie against the face with the result that the teeth on the wafer are held firmly against the teeth on the body. The edges of the teeth of the wafer constitute the cutting edges of the cutter so that, when the cutting edges become dull, the wafer is simply removed and replaced with a new one. In another form, the teeth on the body are helical and their end faces are inclined in stepped relation while the wafer teeth are on the free ends of flexible fingers which, when the wafer is clamped to the body, flex to lie against the end faces of the teeth on the body.

36 Claims, 11 Drawing Figures

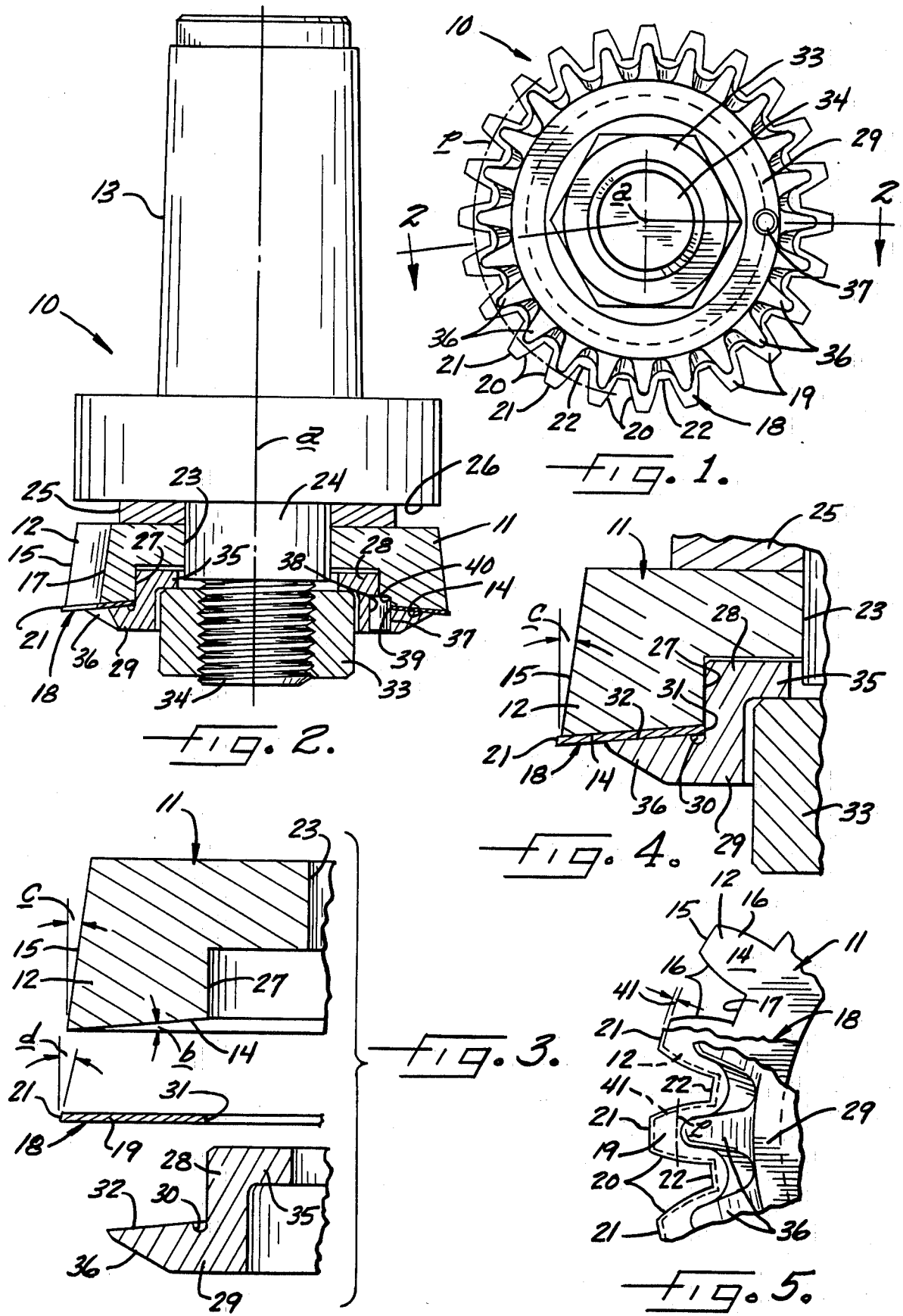

SHAPER CUTTER

CROSS-REFERENCE TO RELATED APPLICATION

This application is a continuation-in-part of my copending application Ser. No. 515,795, filed July 21, 1983, and now abandoned.

BACKGROUND OF THE INVENTION

This invention relates to a cutter for a shaper and, more particularly, to a cutter for cutting irregular shapes such as the teeth of a gear. Customarily, such cutters include a conical body with a plurality of teeth equally spaced angularly around the periphery of the body. The ends, sides and roots of the teeth are inclined radially inwardly from the face of the body so that the edges of the teeth constitute the cutting edges of the cutter. Frequently, the cutter is surface coated as with a thin film of titanium nitride.

When the cutting edges of such a tool become dull, they are resharpened by grinding the face of the tool and hence the faces of the teeth. Such grinding presents a number of difficulties. For one thing, because the ends, sides and roots of the teeth are inclined, the grinding changes the relationship between the cutter and the workpiece and the original set-up of the cutter and the work must be adjusted to compensate for this. Also, it is difficult to achieve a high quality of sharpening as compared with the sharpening performed at the point of manufacture. In addition, where the cutter is coated, the cutting edges and surfaces are no longer coated after grinding.

SUMMARY OF THE INVENTION

The general object of the invention is to provide a new and improved cutter of the foregoing type with a novel arrangement for providing the cutting edges so that sharp cutting edges may be restored without grinding and without changing the relationship between the cutting teeth and the workpiece.

A more detailed object is to achieve the foregoing by forming teeth with the cutting edges of the cutter on a thin wafer which is attached to and conforms to the teeth and the face of a tool holder, the latter being basically the same as the body of prior cutters, so that, when the cutting edges become dull, the wafer is removed and replaced with a new one.

Another object is to make the end face of the body of the tool holder concave and conical and to use a flexible wafer which is clamped at its center portion to the end face and flexes to conform to the latter and hold the teeth of the wafer firmly against the teeth on the body.

Still another object is to make the teeth on the wafer larger than the teeth on the body so that the wafer teeth extend slightly beyond the ends, sides and roots of the teeth on the body and to incline those ends, sides and roots inwardly thereby to form the cutting edges of the tool.

A further object is to utilize the wafer in a stepped tooth helical cutter by inclining the end faces of the teeth on the body in stepped relation to each other and to form the teeth of the wafer on the ends of flexible fingers which are flexed to hold the wafer teeth against the teeth on the body.

The invention also resides in the novel construction of the wafer and the details of its cooperation with the tool holder.

BRIEF DESCRIPTION OF THE DRAWINGS

FIG. 1 is an end view of a cutter embodying the present invention with the cutter mounted on the spindle of a shaper.

FIG. 2 is a sectional view taken along the line 2—2 in FIG. 1.

FIG. 3 is an enlarged fragmentary exploded view of the marginal portion of the cutter, the parts being shown in section.

FIG. 4 is a view similar to FIG. 3 but showing the parts assembled.

FIG. 5 is an enlarged fragmentary end view showing several teeth of the cutter.

DETAILED DESCRIPTION OF THE PREFERRED EMBODIMENT

Figure 6:
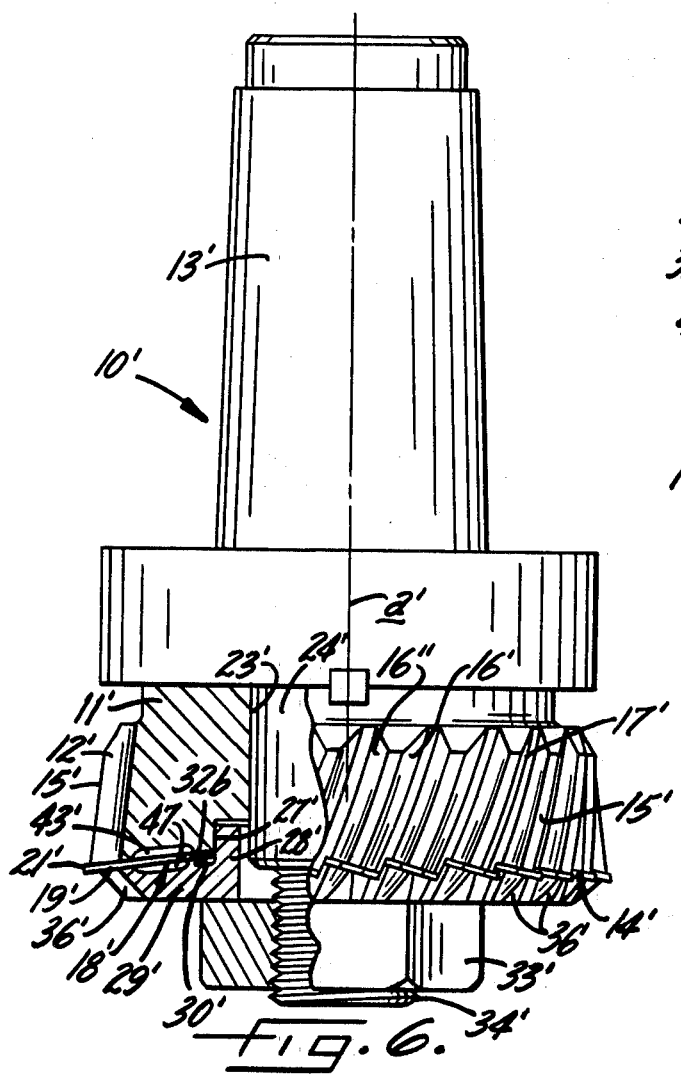
FIG. 6 is a side view with parts broken away and shown in section of a stepped tooth helical cutter embodying the invention.
Figure 7:
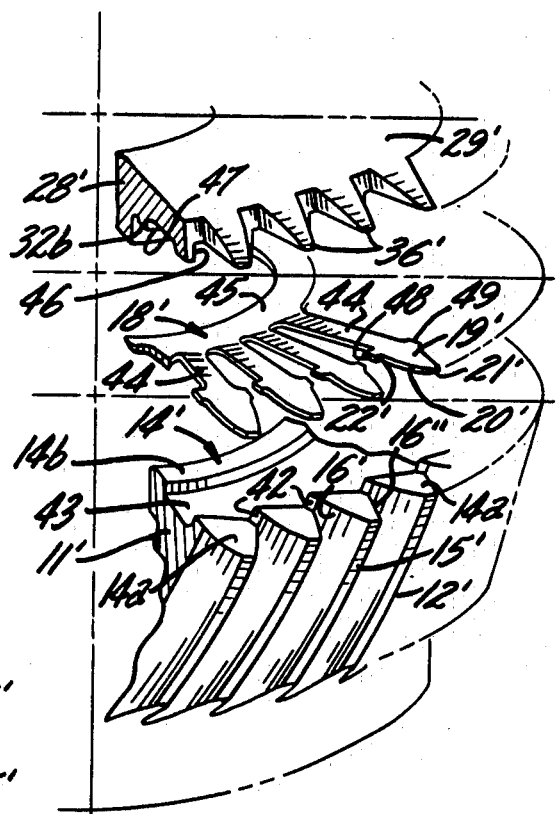
FIG. 7 is an exploded fragmentary perspective view of the body, the wafer and the ring for clamping the wafer to the body as incorporated in the tool of FIG. 6.
Figure 8:
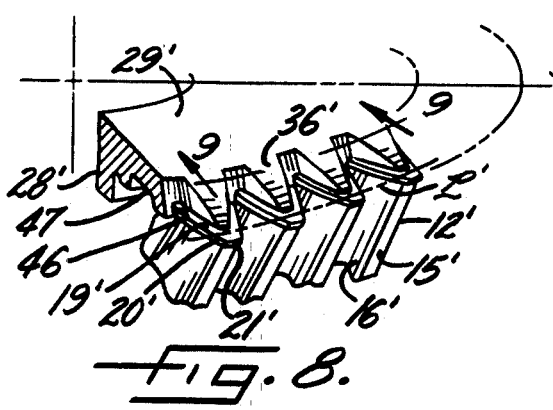
FIG. 8 is a view similar to FIG. 7 but showing the parts clamped together.
Figure 10:
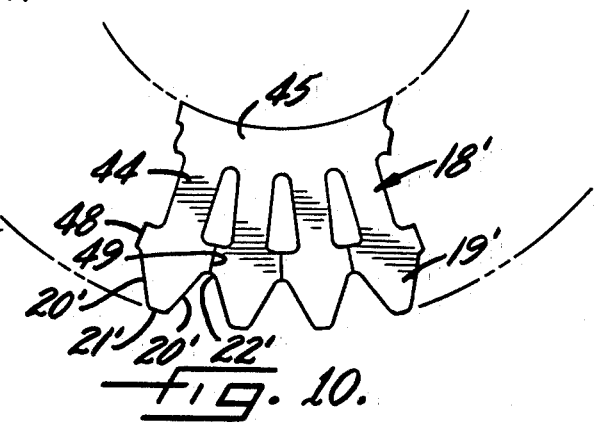
FIG. 10 is a fragmentary plan view of the wafer used in the tool of FIG. 6.
Figure 9:
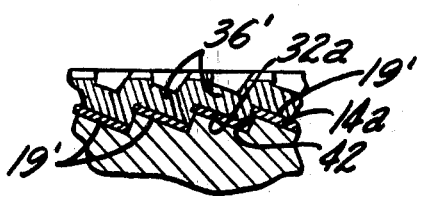
FIG. 9 is a fragmentary sectional view taken along the line 9—9 in FIG. 8.

Although the invention is applicable to tools for cutting various workpieces of irregular shape, it is shown in the drawings for purposes of illustration as embodied in a shaper cutter 10 for cutting teeth on a workpiece such as a gear blank (not shown). The tool includes a conical body 11 with a plurality of teeth 12 angularly spaced around the periphery of the body. The tool is adapted to be mounted on a spindle adapter 13 and is turned about the axis a of the spindle and the body while the work is turned in synchronism about an axis which, in this instance, is parallel to the axis a. During such turning, the tool is reciprocated longitudinally relative to the work and brought into cutting engagement with the latter and the edges of the teeth, as formed by the intersection of the face 14 of the tool with the ends 15 and sides 16 (FIG. 5) of the teeth and with the root 17, cut the teeth in the work. The teeth on the tool and the teeth cut in the workpiece are conjugate forms so that the teeth on the workpiece are generated during the cutting operation and, in the case of a gear being shaped, these forms are involutes.

The face 14 of the tool 10 is on the larger end of the body 11 and is the surface of a cone with a face angle b (FIG. 3) of between 5 and 10 degrees, 5 degrees being customary in most applications. The ends 15 and the roots 17 of the teeth 12 are inclined inwardly away from the face to provide a back or relief angle c which is usually between 4 and 8 degrees with 8 degrees generally being a suitable angle. The sides 16 of the teeth are inclined toward each other so as not to rub the work during cutting.

With prior tools of this type, the cutting edges of the teeth 12, after becoming dull, have to be resharpened by grinding the face 14 of the tool and hence the faces of the teeth. Usually, the wear and the grinding has resulted in a thickness of 0.015 to 0.025 of an inch of metal being removed. Because the sides 16 and ends 15 of the teeth as well as the roots 17 are inclined to provide clearance for cutting, the relationship between the teeth and the workpiece is changed by the grinding and, accordingly, the original set-up of the tool and the work must be adjusted to compensate for this. These tools presented a number of other disadvantages such as the difficulty of achieving a high quality of sharpening as compared to the sharpening performed at the point of manufacture of the tool. Also, in cases where the tool is surface coated as with a titanium nitride coating, the cutting surface 14 is no longer coated after grinding.

The present invention contemplates the provision of a novel cutting tool 10 of the foregoing type in which sharp cutting edges are restored without grinding and without changing the relationship between the cutting teeth and the workpiece. To this end, the cutting edges are formed on a thin metal wafer 18 which is easily fixed to and conforms to the shape of the face 14 of a tool holder which is basically the same body 11 as that of a solid tool. The wafer is provided with a plurality of teeth 19 backed by the teeth 12 on the holder and is held firmly against the face without the need for any bonding thereby permitting the wafer to be removed. Thus, when the cutting edges become dull, the wafer simply is removed and replaced with another one. The sides 20 and the end 21 of each tooth 19 of the wafer and the roots 22 in between are disposed relative to the plane of the wafer so that these edges generally match respectively the sides 16 and ends 15 of the body teeth 12 and the roots 17. Preferably, the teeth on the wafer are larger than the teeth on the body so that the ends, sides and roots of the wafer teeth extend slightly beyond the corresponding portions of the teeth on the body.

While the invention is applicable generally to elongated tool bodies having a circular cross section and having flat, concave or convex surfaces at the forward end face, the preferred embodiment employs a body similar to the bodies of prior tools, that is, a conical body 11 with a concave end face 14 in the shape of a shallow cone. According to another aspect of the invention, therefore, the wafer is flexible and, when clamped against the body, flexes to conform to the shape of the end face and the teeth 19 on the wafer resiliently bear against the end faces of the teeth 12 on the body. Thus, in the form of the invention illustrated in FIGS. 1 through 5 of the drawings, the wafer 18 is formed flat from a sheet of tool steel and is thin enough to be flexible so that, when it is drawn in and clamped at the center, it conforms to the conical shape of the face. A thickness of about 0.025 of an inch has been found to be satisfactory, this being about equal to the wear of a conventional tool between grindings.

More specifically, when the invention is embodied in a shaper tool as illustrated in FIGS. 1 through 5, the tool holder 11 has a central bore 23 which is received on the cylindrical portion 24 of the spindle adapter 13 with the holder abutting a spacer 25 which also is received on the cylindrical portion 24 and which abuts the shoulder 26 of the spindle adapter. At its outer end, the tool holder is counterbored as indicated at 27 to receive an annular bushing 28 which has a ring or radial flange 29 with an annular undercut 30 and overlying the inner periphery of the face 14. A center hole 31 in the wafer 18 is received on the bushing with the wafer disposed between the flange 29 and the face 14. The inner surface 32 (FIG. 3) of the flange is conical and is complementary to the face so that the wafer is clamped firmly between the flange and the face, the wafer flexing from its flat natural condition shown in FIG. 3 to the conical shape of FIG. 2 as a result of the clamping. Such clamping is achieved by a nut 33 which is threaded onto the outer end portion 34 of the spindle and bears against an internal radial flange 35 on the bushing 28.

In accordance with still another aspect of the invention, the clamping ring 29 is disposed substantially behind the outer edges of the wafer teeth 19 and, for most conventional applications, is disposed behind the pitch lines p of the wafer teeth so that the ring does not interfere with the flow of the chips cut from the workpiece. Herein, radial projections or fingers 36 equal in number to and angularly alined with the teeth 19 are formed on the clamping ring or flange and bear against the base portions of the wafer teeth to hold the latter firmly against the teeth 12, the ends of the fingers being behind the pitch lines p. To insure that the teeth 19 on the wafer are precisely alined with the teeth 12 on the tool holder, a cylindrical locating pin 37 offset from the spindle axis a projects through a hole 38 in the bushing and a notch 39 in the wafer and into a notch 40 in the tool holder. For small tooth profiles, the radial projections 36 may not be required and a flanged bushing with a cylindrical flange diameter smaller than the tool root 22 may be adequate.

The ends 21 of the teeth 19 on the wafer 18 are formed at an angle d (FIG. 3) relative to the face of the wafer so that these ends provide a back or relief angle when the wafer is clamped against the face 14 of the body. In the form illustrated in FIGS. 1 through 5, the angle which the ends 21 make after the wafer is flexed against the face 14 is the same as the angle d made by the teeth 12 on the tool holder or body 11. Thus, the angle d is equal to the sum of the face angle b and the outside relief angle c so that, when the wafer is flexed, only the portion corresponding to the angle c remains relative to a line parallel to the axis a of the tool holder 11. For example, if a face angle of 5 degrees and an outside relief angle of 8 degrees are used, the angle d is 13 degrees. By forming the teeth with the angle d, the sides 20 of the wafer teeth and the roots 17 are also angled back so that they do not rub the workpiece during cutting.

As exaggerated somewhat in FIG. 5, the wafer 18 is made slightly larger than the face 14 of the tool holder 11 so that a narrow margin 41 projects beyond the ends 15 and sides 16 of the teeth 12 on the holder and beyond the root 17. It has been found that a margin about 0.0025 of an inch is suitable and this margin, taking assembly tolerances into account, insures that the teeth 19 on the wafer and not the teeth 12 on the tool holder engage the work.

As an example of the manner of forming a wafer 18, a circular blank with the center hole 31 is punched from a sheet of tool steel and then the teeth 19 are formed on the blank as by hobbing. The disk then is heat treated and drawn to a hardness of about 64 Rockwell C. Next, both sides of the wafer are ground flat, the edge of the center hole is ground and the periphery is ground to provide the desired clearance at the teeth including the angle d. Finally, the wafer surface is coated with a thin film of titanium nitride coating.

In use, the tool holder 11 is placed on the spindle adapter 13 and, with the wafer 18 in place on the bushing 28, the latter is inserted in the counterbore 27 of the holder. The pin 37 orients the bushing and the wafer with the tool holder so that the projection 36 and the teeth 19 and 12 are alined with each other as shown in FIG. 5. Then the nut 33 is threaded onto the end portion of the spindle until the wafer is flexed against the face 14 and is tightly clamped between the face and the flange 29 of the bushing. When the wafer is flexed, the edge around the center hole 31 tends to bite into the bushing 28 and this adds to the overall concentric location and rigidity of the wafer. The tool is thus ready to use. When the cutting edges of the wafer teeth become dull, the used wafer is simply replaced with a new wafer. As a result, all the cutting edges of the tool are sharp and these edges together with the adjacent surfaces of the tool are properly coated. At the same time, the positioning of the cutting edges was not changed in either the axial or the radial direction by replacing the wafer and, therefore, no adjustment of the tool is required to maintain the proper tooth dimensions on the workpiece.

In the form shown in FIGS. 6 through 10, the invention is embodied in a stepped tooth helical cutter 10' the corresponding parts of which are identified by the same but primed reference characters. In this case, the teeth 12' on the conical body 11' are helical and, as in the first form, the forward end face 14' of the body is concave and generally in the shape of a shallow cone. The outer annular portion of the face 14' constitutes the faces 14a (FIG. 7) of the teeth 12' which are inclined rearwardly and also stepped so that their ends 15' lie in a common transverse plane. More specifically, the face 14a of each tooth is inclined rearwardly from the leading edge 16' to its trailing edge 16" and the trailing edge of each tooth is connected to the leading edge of the next tooth by a longitudinal surface 42. Spaced behind the faces 14a of the teeth is an annular surface 14b which also constitutes a part of the face 14' and which is concave and conical. The faces 14a are oriented relative to the annular surface 14b so that continuations of the radial centerlines of the tooth faces lie on the annular surface. For a purpose to be explained later, an annular recess 43 is formed in the forward end of the body 11' between the tooth faces 14a and the annular surface 14b.

As used in a stepped tooth helical cutter, the teeth 19' on the wafer 18' are integrally formed on the ends of flexible fingers 44 which project outwardly from the inner annulus 45 of the wafer. In the tool illustrated in FIGS. 6 through 10, the fingers project radially from the annulus and are substantially narrower than the teeth so that they readily flex by twisting to permit the teeth on the wafer to lie flat against the faces 14a of the teeth 12' on the body 11'. The annulus 45 is adapted to flex and conform to the concave shape of the annular surface 14b on the forward end of the body.

As in the first form, the clamping ring 29' is a radial flange on an annular bushing 28' which is received in a counterbore 27' in the forward end of the body 11'. The under surface of the flange includes an inner annular surface 32b which is adjacent the undercut 30' and which is convex and conical to be complementary to the annular surface 14b on the body. Around its outer periphery, the flange 29' is formed with radial projections or fingers 36' equal in number to the teeth 12' on the body. The inner sides 32a (FIG. 9) of the projections are inclined to be complemental with the faces 14a of the teeth 12' but, as in the first embodiment, these projections stop short of the pitch line p' of the latter teeth. Between adjacent projections are short longitudinal surfaces 46 which are spaced from and oppose corresponding ones of the longitudinal surfaces 42 on the body when the flange 29' is in place. Behind the projections is an annular recess 47 which faces and is alined with the annular recess 43 on the body 11' and behind the recess 47 is the annular surface 32b which opposes the surface 14b on the body.

When the teeth 19' of the wafer 18' are clamped against the teeth 12' by the projections 36', the fingers 44, which span the annular recesses 43 and 47, twist to permit the wafer teeth to lie flat against the faces 14a of the body teeth. The wafer teeth are formed with the appropriately shaped ends 21', sides 20' and roots 22' and these teeth are slightly larger than the faces 14a to overhang the teeth 12'. As in the case of the first embodiment, the ends, sides and roots of the wafer teeth when the latter are against the faces 14a have a back angle, that is, they are inclined inwardly away from the forward end of the body 11'. As in the first form, the sides, ends and roots are ground when the wafer is flat to angles which will result in the desired back angles when the wafer is in place. In order to locate the wafer teeth accurately, they are formed with radial edges 48 and 49 behind the roots 22' at the leading and trailing sides of the teeth respectively. The distance between these edges on a tooth is substantially the same as the spacing between an opposing pair of surfaces 42 and 46 on the body 11' and the clamping ring 29' so that these surfaces engage the edges 49 and 48 respectively thereby locating the associated tooth and preventing the latter from shifting sidewise. With the wafer clamped in this manner against the body by the clamping ring 29', the wafer teeth 19' are firmly backed by the teeth 12' and are in position to cut a workpiece in the normal manner. As in the first embodiment, the wafer is removed and replaced when its teeth become dull.

Figure 11:
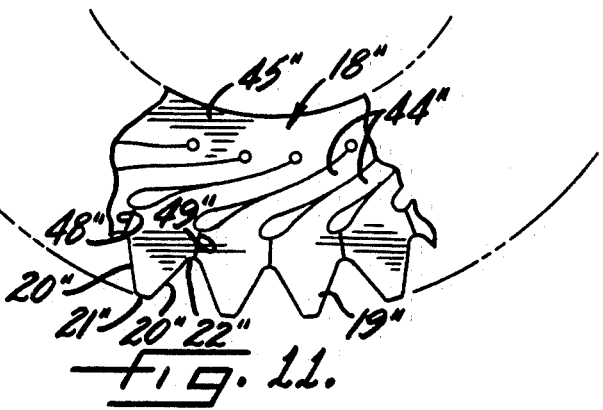
FIG. 11 is a fragmentary plan view of a modified form of wafer usable in a stepped tooth helical cutter.

FIG. 11 shows another form of a wafer 18" for a stepped tooth helical cutter and is especially useful in smaller diameter cutters, the corresponding parts being identified by the same but double primed reference characters. In this case, the radial spacing between the teeth 19" on the wafer 18" and the inner annulus 45" of the wafer is reduced while still having fingers 44" of sufficient length to flex and twist readily as the wafer is clamped to the tool body. To this end, the fingers extend outwardly from the annulus in a generally spiral direction but still span recesses (not shown) similar to the recesses 43 and 46 in FIG. 6 so that they can twist as the wafer is clamped in place.

It will be observed that, with a tool embodying the invention, the teeth on the wafer are rigidly backed by the teeth on the body but all of the cutting is performed by the wafer teeth. Thus, when the wafer teeth become dull, the wafer simply is removed and replaced by a new wafer. Because there has been no change in the size of the tool as otherwise would have occurred if the teeth of the tool had been sharpened by grinding, the relationship of the tool and a workpiece is not changed by replacing the wafer. Moreover, the advantages of the wafer are present whether the tool is of the more conventional type such as shown in FIG. 1 or whether it is a more special tool such as the stepped tooth helical cutter of FIG. 6.

I claim:

1. A tool for cutting metal, said tool comprising, an elongated body having a circular cross section and a forward end, a plurality of outwardly projecting teeth formed on the periphery of said forward end portion of said body and angularly spaced around the latter, the forward end of said body being concave and forming a non-planar surface, a thin sheet metal wafer overlying said forward end surface of said body and having a plurality of cutting teeth formed along the periphery thereof and being equal in number to the teeth on said body, each cutting tooth on said wafer being larger at its ends, sides and roots than the corresponding tooth on said body whereby the cutting teeth on the wafer extend slightly beyond the ends, sides and roots of the teeth on the body, said wafer being flexible to confrom to the shape of said forward end surface and to lie against the latter, and means adjacent the forward end portion of said body and disposed radially inwardly of the cutting teeth on said wafer for flexing said wafer to cause the wafer to lie against said concave forward end surface and to clamp the wafer to said body, the cutting teeth on said wafer when the wafer is flexed generally conforming to the teeth on said body whereby the cutting teeth on the wafer are backed by the teeth on the body and are operable to cut a workpiece as the body is advanced longitudinally in such a direction as to maintain said wafer cutting teeth against said body teeth.

2. A tool as defined in claim 1 in which said body is conical in shape and said forward end is the larger end of the body.

3. A tool as defined in claim 1 in which the teeth on said body extend helically along the latter.

4. A tool as defined in claim 3 in which the faces of the teeth on said body at the forward end thereof are stepped and are inclined rearwardly from their leading edges to their trailing edges, the ends of the teeth on said body lying in a common transverse plane.

5. A tool for cutting metal, said tool comprising, a generally conical body having a larger end and a smaller end, a plurality of outwardly projecting teeth formed on the periphery of said larger end of said body and angularly spaced around the latter, the larger end of said body being concave and forming a shallow conical surface, a thin sheet metal wafer overlying said larger end of said body and having a plurality of cutting teeth formed along the periphery thereof and being equal in number to the teeth on said body, each cutting tooth on said wafer being larger at its ends, sides and roots than the corresponding tooth on said body whereby the cutting teeth on the wafer extend slightly beyond the ends, sides and roots of the teeth on the body, said wafer being flexible to conform to the shape of said larger end and to lie against the latter, and means adjacent the larger end of said body and disposed radially inwardly of the cutting teeth on said wafer for flexing said wafer to cause the wafer to lie against said conical surface on said larger end and to clamp the wafer to said body, the flexing of said wafer producing a spring force holding the wafer against said larger end across the full width of the latter, the cutting teeth on said wafer when the wafer is flexed generally conforming to the teeth on said body whereby the cutting teeth on the wafer are backed by the teeth on the body and are operable to cut a workpiece as the body is advanced longitudinally in such a direction as to maintain said wafer cutting teeth against said body teeth.

6. A tool as defined in claim 5 in which the ends, sides and roots of the teeth on said body are inclined in accordance with the conical shape of the body and the ends, sides and roots of the cutting teeth on said wafer are correspondingly inclined.

7. A tool as defined in claim 5 in which said wafer is coated with a comparatively hard material.

8. A tool as defined in claim 9 in which said material is titanium nitride.

9. A tool as defined in claim 5 in which the teeth on said body extend helically along the latter.

10. A tool as defined in claim 9 in which the faces of said teeth on said body at the forward end thereof are stepped and are inclined rearwardly from their leading edges to their trailing edges, the ends of the teeth on said body lying in a common transverse plane.

11. A tool as defined in claim 10 in which said wafer includes an inner annulus and a plurality of fingers projecting outwardly from said annulus, there being a finger for each of the cutting teeth on said wafer and each cutting tooth of the wafer being formed on the outer end of a finger.

12. A tool as defined in claim 11 in which said fingers project radially outwardly from said annulus.

13. A tool as defined in claim 11 in which said fingers project spirally outwardly from said annulus.

14. A tool for cutting metal, said tool comprising, a generally conical body having a larger end and a smaller end, a plurality of radially projecting teeth formed on the periphery of said larger end of said body and angularly spaced around the latter, a concave face formed on the larger end of said body and forming a shallow conical surface, a thin sheet metal wafer overlying said face and having a plurality of cutting teeth formed around the periphery thereof, the cutting teeth on said wafer being equal in number to the teeth on said body, each cutting tooth on said wafer being larger at its ends, sides and roots than the corresponding tooth on said body whereby the cutting teeth on the wafer extend slightly beyond the ends, sides and roots of the teeth on the body, said wafer normally being flat and being flexible to conform to the shape of said face and to lie against the latter, an annular member overlying said wafer radially inwardly of said cutting teeth and having a surface opposing said face whereby the wafer is disposed between said surface and said face, said surface being convex and generally complemental to said face, and means for drawing said member toward said body thereby to flex said wafer and clamp the wafer between said surface and said face, the cutting teeth on said wafer when the wafer is flexed generally conforming to the teeth on said body whereby the cutting teeth on the wafer are backed by the teeth on the body and are operable to cut a workpiece as the body is advanced longitudinally in such a direction as to maintain said wafer cutting teeth against said body teeth.

15. A tool as defined in claim 14 in which the teeth on said body extend helically along the latter and the faces of the teeth at the forward end of the body are stepped and are inclined rearwardly from their leading edges to their trailing edges, the ends of the teeth on said body lying in a common transverse plane.

16. A tool as defined in claim 15 in which said wafer includes an inner annulus and a plurality of fingers projecting outwardly from the annulus, there being a finger for each of the cutting teeth on said wafer and each cutting tooth of the wafer being formed on the outer end of a finger.

17. A tool as defined in claim 16 in which the larger end of said body is formed with an annular recess behind the teeth on the body to permit said fingers to twist when the cutting teeth on said wafer lie against the teeth on the body.

18. A tool as defined in claim 14 in which said annular member is a ring and including a plurality of radial projections on said ring and overlying the inner portion of the cutting teeth on said wafer, there being a projection for each cutting tooth of the wafer.

19. A tool as defined in claim 18 in which the teeth on said body extend helically along the latter and the faces of the teeth at the forward end of the body are stepped and are inclined rearwardly from their leading edges to their trailing edges, the ends of the teeth on said body lying in a common transverse plane.

20. A tool as defined in claim 19 including a plurality of first longitudinal surfaces formed on said body, one adjacent the trailing edge of each tooth on the body to engage the trailing edge of the corresponding cutting tooth on said wafer, and a plurality of second longitudinal surfaces formed on said ring, one adjacent the leading edge of each of said projections to engage the leading edge of the corresponding cutting tooth on said wafer whereby the cutting teeth on the wafer are positioned between opposing pairs of first and second longitudinal surfaces.

21. A tool for cutting metal, said tool comprising, a generally conical body having a larger end and a smaller end, a plurality of radially projecting teeth formed on the periphery of said larger end of said body and angularly spaced around the latter, a concave face formed on the larger end of said body and forming a shallow conical surface, a thin sheet metal wafer overlying said face and having a plurality of cutting teeth formed along the periphery thereof, the cutting teeth on said wafer being equal in number of teeth on said body, each cutting tooth on said wafer being larger at its ends, sides and roots than the corresponding tooth on said body whereby the cutting teeth on the wafer extend slightly beyond the ends, sides and roots of the teeth on the body, said wafer normally being flat and being flexible to conform to the shape of said face and to lie against the latter, a cylindrical counterbore formed in said body to extend longitudinally thereof and opening through said face, a central hole formed in said wafer, said hole being alined with and the same diameter as said counterbore, a cylindrical bushing having the same diameter as said counterbore and projecting through said hole and into the counterbore, a radial flange formed on said bushing and having a complementary surface overlying said wafer radially inwardly of the teeth thereof, and means coacting with said bushing to clamp said complementary surface of said flange against said wafer thereby flexing the wafer and causing the latter to lie against said conical face, the cutting teeth on said wafer when the wafer is flexed generally conforming to the teeth on said body whereby the cutting teeth on the wafer are backed by teeth on the body and are operable to cut a workpiece as the body is advanced longitudinally in such a direction as to maintain said wafer cutting teeth against said body teeth.

22. A tool as defined in claim 21 in which said flange includes radial projections equal in number to and angularly alined with the cutting teeth on said wafer whereby the projections overlie the base portions of the cutting teeth on the wafer.

23. A tool as defined in claim 21 in which said flange has a convex surface facing said wafer and said surface is complemental to said face on said body.

24. A tool as defined in claim 23 in which said flange includes radial projections equal in number to and angularly alined with the cutting teeth on said wafer whereby the projections overlie the base portions of the cutting teeth on the wafer.

25. A tool as defined in claim 24 in which the ends, sides and roots of the teeth on said body are inclined in accordance with the conical shape of the body and the ends, sides and roots of the cutting teeth on said wafer are correspondingly inclined.

26. A tool as defined in claim 21 in which said hole in said wafer fits closely around said bushing and the wafer bites into the bushing at the edge of the hole when the wafer is flexed.

27. A tool for cutting helical teeth on a workpiece, said tool comprising, an elongated body having a circular cross section and a forward end, a plurality of outwardly projecting teeth formed on the periphery of said forward end of said body and angularly spaced around the latter, the face of each of said teeth being inclined at the forward end of said body rearwardly from the leading edge of the tooth to the trailing edge, said teeth being stepped whereby the ends of the teeth lie in a common transverse plane, a thin sheet metal wafer lying against the forward end of said body inwardly of said teeth and having a plurality of flexible fingers projecting outwardly toward the teeth, there being a finger for each of said teeth, a plurality of second teeth, one formed on the outer end of each of said fingers as an integral part of said wafer, the teeth on said wafer being cutting teeth overlying the faces of the teeth on said body, each cutting tooth on said wafer being larger at its ends, sides and roots than the corresponding tooth on said body whereby the cutting teeth on the wafer extend slightly beyond the ends, sides and roots of the teeth on the body, and means located radially inwardly of said cutting teeth and operable to clamp said wafer against the forward end of said body and to flex said fingers to hold the cutting teeth on the wafer against the faces of the teeth on the body whereby the cutting teeth on the wafer are backed by the teeth on the body and are operable to cut a workpiece as the body is advanced longitudinally in such a direction as to maintain said wafer cutting teeth against said body teeth.

28. A tool as defined in claim 27 in which said body is conical in shape and said forward end is the larger end of the body.

29. A tool as defined in claim 27 in which said fingers project radially outwardly.

30. A tool as defined in claim 27 in which said fingers project spirally outwardly.

31. A tool as defined in claim 27 in which said means includes a plurality of radial projections, one overlying the inner portion of each of the cutting teeth on said wafer to hold the wafer cutting teeth against the faces of the teeth on said body.

32. A tool as defined in claim 27 including a plurality of first longitudinal surfaces formed on said body, one adjacent the trailing edge of each tooth on the body to engage the trailing edge of the corresponding cutting tooth on said wafer, and said means including a plurality of second longitudinal surfaces, one adjacent the leading edge of each of said projections to engage the leading edge of the corresponding cutting tooth on said wafer whereby the cutting teeth on the wafer are positioned between opposing pairs of first and second longitudinal surfaces.

33. A tool for cutting helical teeth on a workpiece, said tool comprising, an elongated conical body having a larger forward end, a plurality of outwardly projecting teeth extending helically along the periphery of said forward end of said body and angularly spaced around the latter, the face of each of said teeth being inclined at the forward end of said body inwardly from the leading edge of the tooth to the trailing edge, said teeth being stepped whereby the ends of the teeth lie in a common transverse plane, a first annular recess formed in said forward end behind said teeth, a first annular surface formed on said forward end radially inwardly of said recess, a thin sheet metal wafer having an annulus lying against said annular surface, said wafer having a plurality of fingers projecting outwardly from said annulus to overlie said recess, there being a finger for each of said teeth, a plurality of cutting teeth, one cutting tooth being formed on the outer end of each of said fingers and each overlying the face of a tooth on said body, each cutting tooth on said wafer being larger at its ends, sides and roots than the corresponding tooth on said body whereby the cutting teeth on the wafer extend slightly beyond the ends, sides and roots of the teeth on the body, a clamping ring opposing said forward end and having a second annular surface opposing said first annular surface and a second annular recess opposing said first annular recess, a plurality of radial projections on the periphery of said ring with each opposing the inner portion of a tooth in said body, said projections having faces opposing and complemental with the faces of the teeth on said body and lying within the confines of the latter faces, and means to clamp said wafer between said ring and said forward end thereby to twist said fingers in the space defined by said recesses and hold the cutting teeth on the wafer against the faces of the teeth on the body so that the cutting teeth on the wafer are backed by the teeth on the body and are operable to cut a workpiece as the body is advanced longitudinally in such a direction as to maintain said wafer cutting teeth against said body teeth.

34. A tool as defined in claim 33 in which said fingers project radially outwardly from said annulus.

35. A tool as defined in claim 33 in which said fingers project spirally outwardly from said annulus.

36. A tool as defined in claim 33 including a plurality of first longitudinal surfaces formed on said body, one adjacent the trailing edge of each tooth on the body to engage the trailing edge of the corresponding cutting tooth on said wafer, and a plurality of second longitudinal surfaces formed on said ring, one adjacent the leading edge of each of said projections to engage the leading edge of the corresponding cutting tooth on said wafer whereby the cutting teeth on the wafer are positioned between opposing pairs of first and second longitudinal surfaces.

* * * * *